United States Patent
Akita et al.

(10) Patent No.: US 6,926,998 B2
(45) Date of Patent: Aug. 9, 2005

(54) NICKEL-METAL HYDRIDE STORAGE BATTERY

(75) Inventors: Hiroyuki Akita, Kobe (JP); Tadayoshi Tanaka, Takatuki (JP); Yoshifumi Magari, Kobe (JP); Katsuhiko Shinyama, Kobe (JP); Atsuhiro Funahashi, Suita (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 229 days.

(21) Appl. No.: 10/321,651

(22) Filed: Dec. 18, 2002

(65) Prior Publication Data

US 2003/0124425 A1 Jul. 3, 2003

(30) Foreign Application Priority Data

Dec. 21, 2001 (JP) .......................... 2001-389941

(51) Int. Cl.$^7$ ........................... H01M 4/32; H01M 4/52
(52) U.S. Cl. ................ 429/218.2; 429/223; 429/231.2; 429/218.1; 420/900
(58) Field of Search .............................. 429/218.2, 223, 429/231.2, 218.1; 420/900

(56) References Cited

U.S. PATENT DOCUMENTS

| 5,888,665 A | * | 3/1999 | Bugga et al. ................... 429/40 |
| 6,027,834 A | | 2/2000 | Hayashi et al. ............. 429/223 |
| 6,338,917 B1 | * | 1/2002 | Maeda et al. ................ 429/223 |

FOREIGN PATENT DOCUMENTS

| CN | 1179631 A | 4/1998 | |
| EP | 1 006 598 A2 | 6/2000 | |
| EP | 1 075 031 A1 | 2/2001 | |
| JP | 04-188561 A | 7/1992 | |
| JP | 04-188561 | * 7/1992 | ............ H01M/4/24 |
| JP | 2001-319646 | 11/2001 | |

* cited by examiner

*Primary Examiner*—Patrick Joseph Ryan
*Assistant Examiner*—Angela J. Martin
(74) *Attorney, Agent, or Firm*—Kubovcik & Kubovcik

(57) ABSTRACT

A nickel-metal hydride storage battery comprising a positive electrode containing nickel hydroxide, a negative electrode containing a hydrogen absorbing alloy and an alkaline electrolyte, wherein the positive electrode contains a hydroxide and/or an oxide of an element selected from the group consisting of calcium, strontium, scandium, yttrium, lanthanoid and bismuth, and the negative electrode contains germanium.

11 Claims, 1 Drawing Sheet

NICKEL-METAL HYDRIDE STORAGE BATTERY

FIELD OF THE INVENTION

The present invention relates to a nickel-metal hydride storage battery that includes a positive electrode containing nickel hydroxide, a negative electrode containing a hydrogen absorbing alloy and an alkaline electrolyte. Specifically, a nickel-metal hydride storage battery of the present invention is characterized by providing sufficient charge capacity even if the battery is discharged at a high electric current.

BACKGROUND OF THE INVENTION

A nickel-metal hydride storage battery, nickel-cadmium storage battery, nickel-zinc storage battery, and the like, have been used as alkaline storage batteries. The nickel-metal hydride storage battery that has a high output and is environmentally safe is especially widely used.

A nickel-metal hydride storage battery uses nickel hydroxide for a positive electrode and a hydrogen absorbing alloy for a negative electrode.

The nickel-metal hydride storage battery has recently been used as an electric source for electric vehicles, hybrid electric vehicles, electric bicycles, power tools, and the like. The battery is desired to have high capacity and sufficient capacity when the battery is discharged at a high electric current.

An alkaline storage battery with improved discharge characteristics has been proposed that is provided by the addition of an oxide or ions of Al, Ga, Ge, and the like, to a negative electrode containing a hydrogen absorbing alloy or to an alkaline electrolyte to reduce excess voltage during discharge as disclosed in Japanese patent publication (Tokkou) No. 3,118,832.

However, even such an improved alkaline storage battery generates oxygen at the positive electrode when charge depth is increased, and a high capacity cannot be obtained. There is a problem that discharge characteristics also cannot be improved sufficiently and discharge capacity is reduced when the battery is discharged at a high electric current.

OBJECTS OF THE INVENTION

Objects of the present invention are to solve the above-described problems in a nickel-metal hydride storage battery comprising a positive electrode containing nickel hydroxide, a negative electrode containing a hydrogen absorbing alloy and an alkaline electrolyte, to increase charge acceptability at the positive electrode, to prevent generation of oxygen from the positive electrode when the charge depth is increased and to obtain a high capacity. Obtaining a high discharge capacity when the battery is discharged at a high electric current is also an object of the present invention.

SUMMARY OF THE INVENTION

In the present invention to solve the above-described problem, the positive electrode contains at least a hydroxide and/or an oxide of at least one element selected from the group consisting of calcium, strontium, scandium, yttrium, lanthanoid and bismuth, and the negative electrode contains germanium.

EXPLANATION OF ELEMENTS

Figure 1:
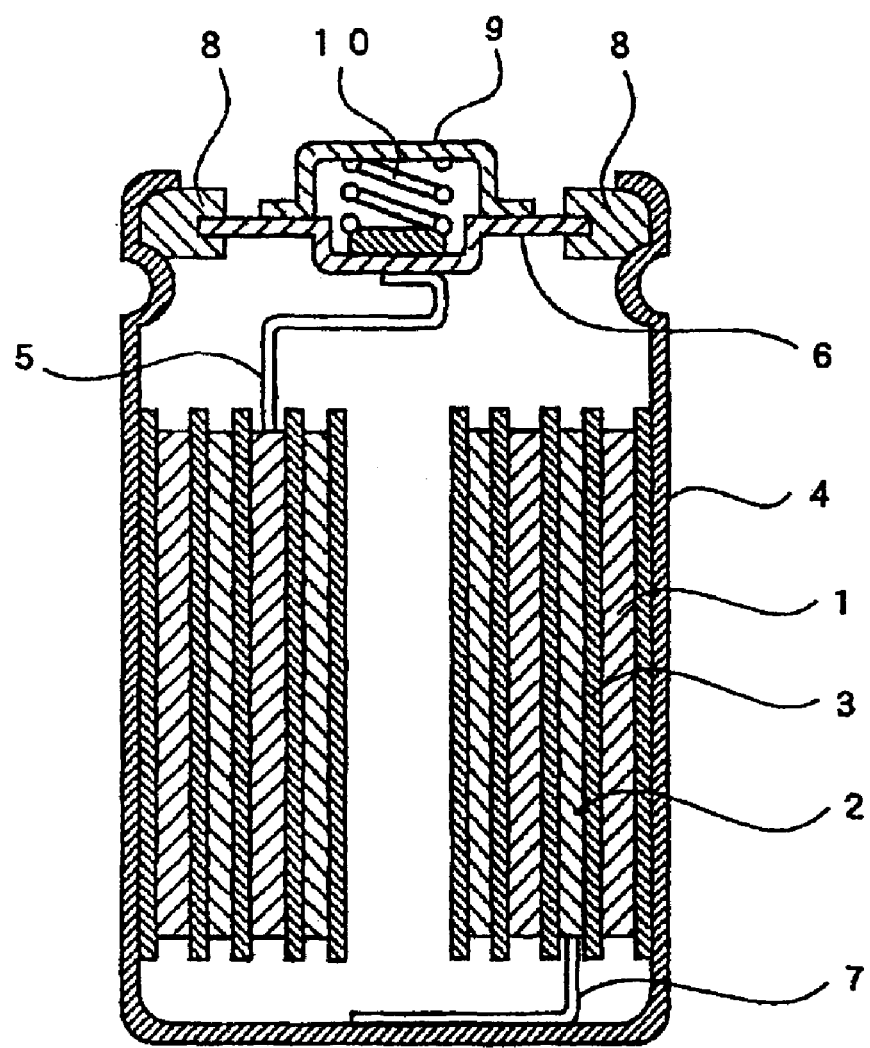
FIG. 1 is a cross section of a nickel-metal hydride storage battery prepared in the Example and Comparative Examples.

1: positive electrode
2: negative electrode
3: separator
4: negative electrode can
5: positive electrode lead
6: sealing lid
7: negative electrode lead
8: insulation packing
9: positive electrode external terminal
10: coil spring

DETAILED EXPLANATION OF THE INVENTION

When a hydroxide and/or an oxide of at least one element selected from the group consisting of calcium, strontium, scandium, yttrium, lanthanoid and bismuth is added to a positive electrode comprising nickel hydroxide, and germanium is added to a negative electrode of a nickel-metal hydride storage battery, oxygen generating potential at the positive electrode increases and charge acceptability is dramatically improved. As a result, generation of oxygen at the positive electrode is inhibited to obtain a high capacity. The mechanism is not clear, but it is believed that a reaction between the element (s) added to the positive electrode and germanium ions that are dissolved from the negative electrode and transferred to the positive electrode contribute to the effects.

Addition of germanium to the negative electrode has other advantages. The surface of the hydrogen absorbing alloy is activated by the residual germanium not dissolved in the negative electrode to increase discharge characteristics and, especially, a high discharge capacity can be obtained when the battery is discharged at a high electric current.

When a hydroxide and/or an oxide of at least one element selected from the group consisting of calcium, strontium, scandium, yttrium, lanthanoid and bismuth is added to the positive electrode, at least a portion of the surface of the positive electrode is coated with the hydroxide and/or oxide of the element and generation of oxygen at the positive electrode during charge can be more efficiently prevented.

When a hydroxide and/or an oxide of at least one element selected from the group consisting of calcium, strontium, scandium, yttrium, lanthanoid and bismuth is added to the positive electrode containing the nickel hydroxide, if the amount of hydroxide and/or an oxide added to the positive electrode is not sufficient, the expected effects described above cannot be obtained. On the other hand, if the amount of the hydroxide and/or oxide added to the positive electrode is excessive, the ratio of the nickel hydroxide in the positive electrode becomes small and capacity per weight is reduced. Therefore, an amount of the hydroxide and/or oxide added to the positive electrode based on the total amount of the positive electrode active material and the hydroxide and/or oxide is preferably in a range of 0.5 to 5% by weight.

The germanium added to the negative electrode is preferably in a form of a hydroxide and/or an oxide because if it is added in the form of the metal, the metal germanium is mainly dissolved into an alkaline electrolyte and the amount of germanium remaining in the negative electrode is significantly reduced and discharge characteristics of the negative electrode cannot be sufficiently improved.

If the amount of germanium added to the negative electrode is not sufficient, the expected effects described above cannot be obtained. On the other hand, if the amount of germanium added to the negative electrode is excessive, the ratio of the hydrogen absorbing alloy in the negative electrode becomes small and capacity per weight is reduced. Therefore, an amount of germanium added to the negative electrode based on the hydrogen absorbing alloy is preferably in a range of 0.01 to 2% by weight.

DESCRIPTION OF PREFERRED EMBODIMENT

EXAMPLE

An example of a nickel-metal hydride storage battery of the present invention is described below and is compared with comparative examples to show that charge acceptability of a positive electrode of the battery is increased to obtain a high capacity as well as a high discharge capacity when the battery is discharged at a high electric current. It is of course understood that the present invention can be modified within the scope and spirit of the appended claims.

A positive and negative electrode prepared as described below were used in Example 1.

[Preparation of Positive Electrode]

In the present example, a porous sintered nickel substrate prepared in the following manner was used to produce each positive electrode for nickel-metal hydride storage battery.

In preparation of the porous sintered nickel substrate, carbonyl nickel powder and a binder were kneaded to prepare a nickel slurry, and the slurry was applied to a punching metal having a thickness of 50 $\mu$m. The slurry on the punching metal was dried, and then sintered in a reducing atmosphere, to obtain the porous sintered nickel substrate. The porous sintered nickel substrate thus obtained had a porosity of 85% and a thickness of 0.65 mm.

Next, the porous sintered nickel substrate was immersed in a mixed solution of nickel nitrate, cobalt nitrate and zinc nitrate so that the mixed solution was impregnated into the porous sintered nickel substrate, after which the sintered nickel substrate was immersed in a 25% sodium hydroxide (NaOH) aqueous solution so that hydroxides of nickel, cobalt and zinc were deposited on the sintered nickel substrate. The above-mentioned operation was repeated six times to provide an active material mainly containing nickel hydroxide to the above-mentioned sintered nickel substrate.

The sintered nickel substrate filled with the positive electrode active material was immersed in a 3% by weight yttrium nitrate solution, and then was immersed in a 25% by weight sodium hydroxide solution (NaOH) that had been heated to 80° C. to obtain a positive electrode in which a coating layer of yttrium hydroxide $(Y(OH)_3)$ was formed on the positive electrode active material filled in the sintered nickel substrate. An amount of yttrium hydroxide $(Y(OH)_3)$ relative to the total amount of the positive electrode active material and yttrium hydroxide $(Y(OH)_3)$ was 3% by weight.

[Preparation of Negative Electrode]

Particle of a hydrogen absorbing alloy having an average particle diameter of 50 $\mu$m and a formula of $MmNi_{3.2}Co_{1.0}Al_{0.2}MN_{0.6}$ were prepared using Ni, Co, Al, Mn and Misch Metal (Mm), that includes La, Ce, Pr and Nd in a ratio by weight of 25:50:6:19.

A small amount of water was added to a mixture of 100 parts by weight of the hydrogen absorbing alloy particles, 0.5 part by weight of germanium oxide $(GeO_2)$ and 1.0 part by weight of poly(ethylene oxide) as a binder to prepare a paste. The paste was coated on both sides of a current collector comprising a nickel plated punching metal. The coated current collector was dried and was rolled to obtain a negative electrode in which germanium oxide $(GeO_2)$ was added to a hydrogen absorbing alloy. In the negative electrode, the amount of germanium in germanium oxide $(GeO_2)$ to the hydrogen absorbing alloy is 0.35% by weight.

A cylindrical nickel-metal hydride storage battery having a designed capacity of 1000 mAh as shown in FIG. 1 was prepared using the positive and negative electrodes prepared above, an alkaline resistant nonwoven fabric as a separator and 30% by weight of potassium hydroxide as an alkaline electrolyte.

The separator 3 was inserted between the positive electrode 1 and the negative electrode 2 and was rolled spirally, and was placed in a negative electrode can 4 as shown in FIG. 1. The alkaline electrolyte was poured into the negative electrode can 4 and the can was sealed. The positive electrode 1 was connected to a sealing lid 6 through a positive electrode lead 5, and the negative electrode 2 was connected to the negative electrode can 4 through a negative electrode lead 7. The negative electrode can 4 and sealing lid 6 were electrically insulated by an insulation packing 8. A coil spring 10 was placed between the positive sealing lid and a positive electrode external terminal 9. The coil spring 10 is compressed and releases gas from inside of the battery to the atmosphere when pressure in the battery unusually increases.

COMPARATIVE EXAMPLE 1

A nickel-metal hydride storage battery in Comparative Example 1 was prepared in the same manner as Example 1 described above except that germanium oxide $(GeO_2)$ was not added to the hydrogen absorbing alloy particles when the negative electrode was prepared.

COMPARATIVE EXAMPLE 2

A nickel-metal hydride storage battery in Comparative Example 2 was prepared in the same manner as Example 1 described above except that a coating layer of yttrium hydroxide $(Y(OH)_3)$ was not formed on a positive electrode active material filled in a sintered nickel substrate when the positive electrode was prepared.

COMPARATIVE EXAMPLE 3

A nickel-metal hydride storage battery in Comparative Example 3 was prepared in the same manner as Example 1 described above except that germanium oxide $(GeO_2)$ was not added to the hydrogen absorbing alloy particles when the negative electrode was prepared and a coating layer of yttrium hydroxide $(Y(OH)_3)$ was not formed on a positive electrode active material filled in a sintered nickel substrate when the positive electrode was prepared.

Then the nickel-metal hydride storage batteries prepared in Example 1 and Comparative Examples 1 to 3 were charged at 100 mA for 16 hours at a temperature of 25° C., and were discharged at 100 mA to 1.0 V at a temperature of 25° C. (this charge and discharge cycle is considered a cycle). Charge and discharge of the batteries were repeated for ten cycles to activate the batteries.

The activated nickel-metal hydride storage batteries in Example 1 and Comparative Examples 1 to 3 were charged at 500 mA for 2.4 hours at a temperature of 25° C. to reach a charge depth of 120%, and voltages of the battery were measured when they were over charged. The results are shown in Table 1. A voltage of an over charged battery correlates with an oxygen generating potential at a positive electrode. That is, when a voltage of a battery is high, generation of oxygen is inhibited during charge and a battery having a high capacity is obtained.

The activated nickel-metal hydride storage batteries in Example 1 and Comparative Examples 1 to 3 were charged at 500 mA for 2.4 hours at a temperature of 25° C. to reach a charge depth of 120%, and were discharged at 1 A to 1.0 V at a temperature of 25° C. to obtain discharge capacities (Qa). Discharge capacities (Qb) that were capacities when the batteries were discharged at 12 A to 1.0 V were also measured. A discharge ratio of the discharge capacity at 12 A to that at 1 A was calculated according to the following formula. The results are shown in Table 1. When the discharge ratio is greater, higher discharge capacity at a high electric current can be obtained.

Capacity Ratio $(\%) = Qb/Qa \times 100$

TABLE 1

| | $GeO_2$ in Negative Electrode | $Y(OH)_3$ in Positive Electrode | Voltage (V) of Overcharged Battery | Capacity Ratio of 12A/1A (%) |
|---|---|---|---|---|
| Example 1 | Yes | Yes | 1.478 | 73 |
| Comparative Example 1 | No | Yes | 1.458 | 60 |
| Comparative Example 2 | Yes | No | 1.450 | 53 |
| Comparative Example 3 | No | No | 1.450 | 50 |

As is clear from the results, the nickel-metal hydride storage battery in Example 1 having the positive electrode that contains a coating layer of yttrium hydroxide ($Y(OH)_3$) on the positive electrode active material filled in the sintered nickel substrate as well as the negative electrode that contains germanium oxide ($GeO_2$) added to the hydrogen absorbing alloy particles had a higher voltage at overcharging as compared with the batteries in Comparative Examples 1 to 3, and a high battery capacity was obtained. The capacity ratio of the battery in Example 1 was also significantly high. That is, a high discharge capacity was obtained even if an electric discharge current was high. The battery in Comparative Example 1 had only a positive electrode having a coating layer of yttrium hydroxide ($Y(OH)_3$) on the positive electrode active material filled in the sintered nickel substrate; the battery in Comparative Example 2 had only germanium oxide ($GeO_2$) added to hydrogen absorbing alloy particles; and the battery in Comparative Example 3 had neither a positive electrode that contains a coating layer of yttrium hydroxide ($Y(OH)_3$) on the positive electrode active material filled in the sintered nickel substrate nor a negative electrode that contains germanium oxide ($GeO_2$) combined with hydrogen absorbing alloy particles.

The effects of a coating layer of yttrium hydroxide ($Y(OH)_3$) on the positive electrode active material are described above. However, similar effects are obtained when yttrium oxide or a hydroxide or an oxide of at least one element selected from calcium, strontium, scandium, lanthanoid and bismuth is used.

ADVANTAGES OF THE INVENTION

As explained above in detail, the oxygen generating potential at the positive electrode of the nickel-metal hydride storage battery of the present invention is increased and charge acceptability is dramatically increased. As a result, even if charge depth is increased, generation of oxygen at the positive electrode is inhibited to obtain a high capacity. Discharge characteristics are also improved by activation of the surface of the hydrogen absorbing alloy. Specifically, high capacity can be obtained even if the battery is discharged at a high electric current.

What is claimed is:

1. A nickel-metal hydride storage battery comprising a positive electrode containing nickel hydroxide, a negative electrode containing a hydrogen absorbing alloy and an alkaline electrolyte, wherein said positive electrode contains a hydroxide and/or an oxide of yttrium, and said negative electrode contains germanium hydroxide and/or germanium oxide.

2. The nickel-metal hydride storage battery according to claim 1, wherein at least a portion of a surface of the nickel hydroxide in said positive electrode is coated with the hydroxide and/or the oxide of yttrium.

3. The nickel-metal hydride storage battery according to claim 1, wherein at least a portion of a surface of the nickel hydroxide in said positive electrode is coated with yttrium hydroxide and/or yttrium oxide.

4. The nickel-metal hydride storage battery according to claim 2, wherein at least a portion of a surface of the nickel hydroxide in said positive electrode is coated with yttrium hydroxide and/or yttrium oxide.

5. The nickel-metal hydride storage battery according to claim 1, wherein said positive electrode is a sintered nickel electrode.

6. The nickel-metal hydride storage battery according to claim 2, wherein said positive electrode is a sintered nickel electrode.

7. The nickel-metal hydride storage battery according to claim 3, wherein said positive electrode is a sintered nickel electrode.

8. The nickel-metal hydride storage battery according to claim 4, wherein said positive electrode is a sintered nickel electrode.

9. The nickel-metal hydride storage battery according to claim 1, wherein an amount of the hydroxide and/or the oxide of yttrium, contained in the positive electrode based on the total amount of nickel hydroxide and said hydroxide and/or oxide is in a range of 0.5 to 5% by weight.

10. The nickel-metal hydride storage battery according to claim 2, wherein an amount of the hydroxide and/or the oxide of yttrium, contained in the positive electrode based on the total amount of nickel hydroxide and said hydroxide and/or oxide is in a range of 0.5 to 5% by weight.

11. The nickel-metal hydride storage battery according to claim 1, wherein an amount of germanium contained in the negative electrode based on the hydrogen absorbing alloy is in a range of 0.01 to 2% by weight.

* * * * *